Dec. 6, 1960   W. L. CAWTHON ET AL   2,963,112
AUTOMATIC AIR FILTER
Filed May 3, 1956   5 Sheets-Sheet 1

FIG. 1.

INVENTORS
OMER A. PETTI
WILLIAM L. CAWTHON
BY Moore and Hall
ATTORNEYS

Dec. 6, 1960 W. L. CAWTHON ET AL 2,963,112
AUTOMATIC AIR FILTER
Filed May 3, 1956 5 Sheets-Sheet 2

INVENTORS
OMER A. PETTI
WILLIAM L. CAWTHON
BY Moore and Hall
ATTORNEYS

Dec. 6, 1960 W. L. CAWTHON ET AL 2,963,112
AUTOMATIC AIR FILTER
Filed May 3, 1956 5 Sheets-Sheet 4

INVENTORS
Omer A. Petti
William L. Cawthon
BY Moore & Hall
ATTORNEYS

INVENTORS
OMER A. PETTI
WILLIAM L. CAWTHON

BY

ATTORNEYS

United States Patent Office 2,963,112
Patented Dec. 6, 1960

2,963,112
AUTOMATIC AIR FILTER

William L. Cawthon, Dearborn, and Omer A. Petti, Detroit, Mich., assignors to Green Fuel Economizer Co., Inc., Beacon, N.Y.

Filed May 3, 1956, Ser. No. 582,458

13 Claims. (Cl. 183—62)

The present invention concerns automatic air filters.

It is an object of the invention to provide an automatic air filter with intermittent or continuous change of filter means under the control of the conditions of filtering and of the state of the filter itself.

It is an object of the invention to provide an automatic filter for air and related gases in which the filtering material is mounted on a roll and drawn across an orifice to intercept foreign particles suspended in an atmosphere.

It is an object of the invention to provide an automatic air filter having novel sealing means wherein a pivoted frame supports a movable filter web and acts to seal the web against an adjacent frame or release it for movement.

It is an object of the invention to provide novel indexing means whereby the movement of a filter web to introduce new filtering material can be controlled despite variations in the effective diameter of the take-up roll.

It is an object of the invention to provide a novel sealing arrangement for a filter web positioned to intercept foreign material in a moving atmosphere in which means such as a solenoid are employed to seat the web immediately after new filter material has been introduced.

It is an object of the invention to provide deflecting means in front of the air stream whereby a certain amount of turbulence is obtained so that a better filtering action may take place at the filtering web.

It is an object of the invention to provide a pressure differential control means for automatic operation of the filter web advancing structure.

It is an object of the invention to provide means to index a predetermined amount of filter web per day or per selected period as indicated by a timer or by such means as an interconnecting circuit from a station removed from the filter structure itself, which station may be employed as an overall control for the equipment and which is normally operated only at selected intervals.

It is an object of the invention to provide automatic control for the regulation of filter material by means of a flow or differential pressure switch which responds to the action of air to cut off a motor.

It is an object of the invention to provide suitable limiting switches to control the action of a motor connected to advance a filtering web.

It is an object of the invention to provide an automatic filter device having a movable web of filter material such as spun glass or the like supplied from a roll and mounted on rollers for hanging over a suitable air flow orifice, means to advance the web automatically when the air flow drops below a certain desired figure, means to determine the amount of advance when this is not determined by means to determine rate of air flow and means operating automatically to unseal and reseal the filter before and after each advance.

The purpose of the unit is to clean contaminated air with an absolute minimum of maintenance, service and operating cost.

The filter section has the clean and dirty filter media rolls on the upstream side. The discharge side is arranged so that the only opening is the face area of the filtering medium.

A maximum amount of free area is utilized to take full advantage of available space. An extremely small amount of border area is required at top, bottom and sides. This is made possible by locating the clean and dirty rolls of media remote from the available free area. This arrangement makes it possible to use longer rolls of medium for longer running time per roll or more dense media for higher cleaning efficiencies.

The unique design of the self adjusting floating tubular seal assures that a constant seal is maintained on the medium while in normal operation as well as when indexing. During indexing, the force of the material being pulled through and against the seal allows enough clearance for the material to slide through, but also affords sufficient resistance to prevent the heavy loaded filter material from falling through or permitting any by-pass of contaminated air.

The automatic filter is furnished in standard five, four and three foot wide sections. The sections can be arranged in a bank with simple disconnecting couplings so that one motor can drive a number of units in tandem. The height of the unit is variable in four inch increments to suit available space requirements.

The section is so constructed that the housing can be bolted to the fan station enclosure or it can be attached to a plenum chamber with inlet area to match the outlet face area.

The standard filtering medium is a special nonflammable plastic fiber impregnated with a viscious oil coating with high dust holding and dust removing properties. The medium is furnished in tightly wound rolls that compress the 75 lineal feet of material into a 20" diameter roll. The rolls are supplied with a heavy protective covering which when unwound serves as a lead in section, thus providing a convenient means for starting the medium on the dirty medium spool. The end of the clean medium is attached to a similar piece of covering whose dual function is to actuate the medium cutout switch to prevent further indexing and to provide a clean outside covering for the dirty medium roll. Attached to the end of the paper is twine for tying up the dirty medium in a neat bundle for convenient disposal. A wood slat is attached to each clean roll core. This slat serves no purpose for the clean roll but is used to attach the material to the dirty roll core at the start of the roll. Other filtering media such as spun glass or the like can be furnished to give higher cleaning efficiencies but air volume ratings must be adjusted to compensate for increased resistance.

In the drawings like numerals refer to like parts throughout.

Figure 12:
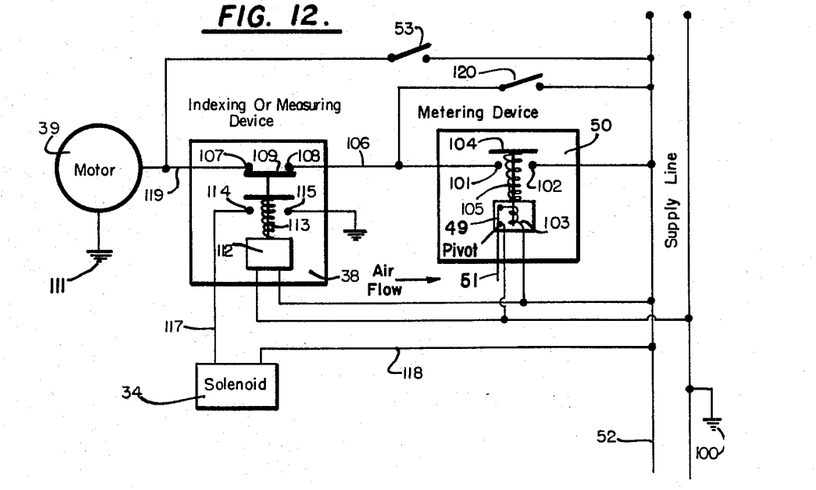
Figure 12 is a schematic representation of one form of control circuit suitable for the automatic control of the present device.
Figure 12A:
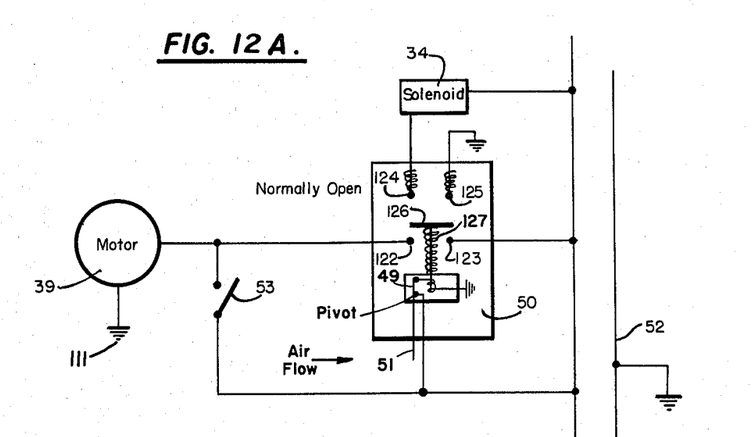
Figure 12A is a variation of Figure 12.

The drawings above referred to, and in particular Figure 12 and Figure 12A are presented as merely illustrative and are not to be taken as limiting in any sense.

Figure 1:
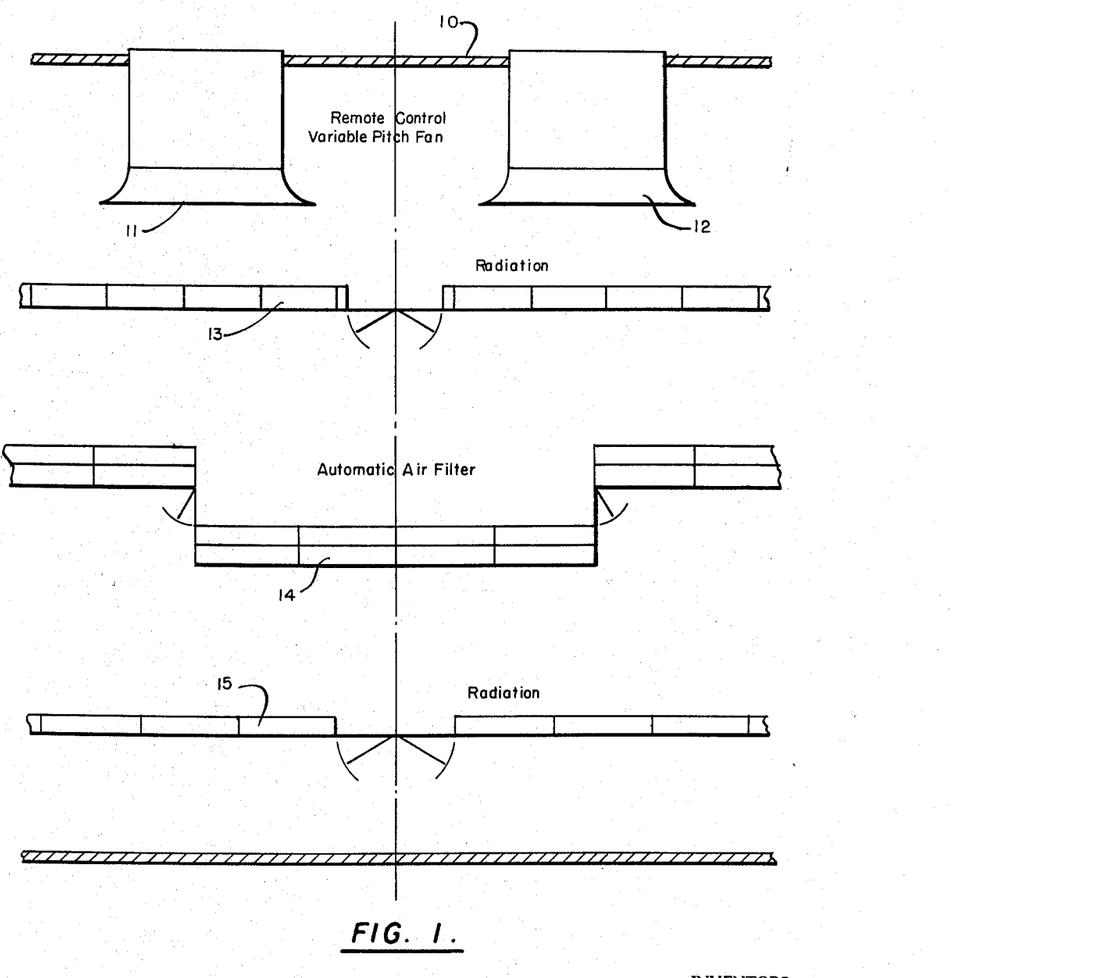
Figure 1 is a plan view of one form of installation of the invention in a building.

In Figure 1 a building 10 may be supplied with two actual intake variable pitch remote control fans 11 and 12. Air flowing through the fans passes through a heater 13, automatic filter means 14 and heater means 15 being drawn by the fans in the reverse order named. It is with the filter means 14 that we are primarily concerned in this case. This filter may be constructed in banks of 5 foot widths and 15 foot heights, each bank of which will accommodate 28,000 cubic feet per minute at a linear speed of 500 feet per minute and afford ample filtering action for most purposes. These figures are illustrative only.

Figure 2:
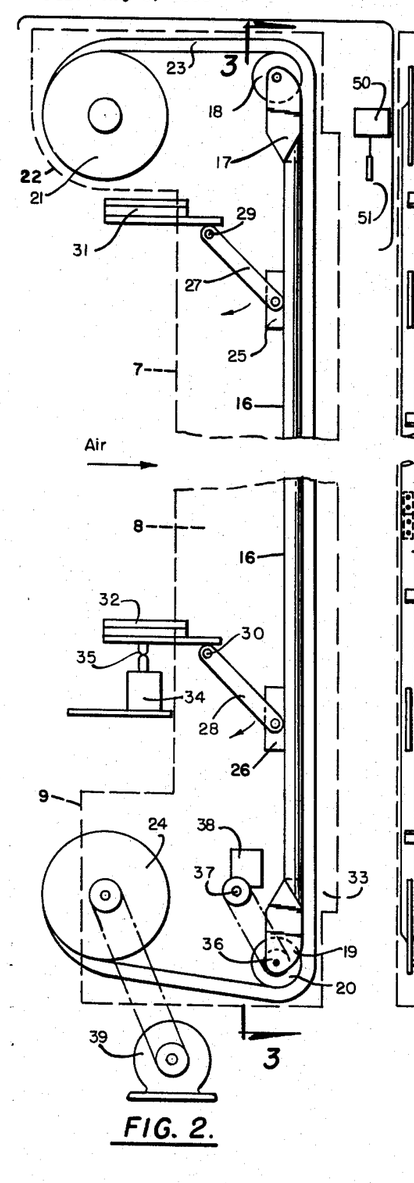
Figure 2 is a side elevation of one form of the invention.

The view shown in Figure 2 presents a framework 16 of tubular material which is provided at its upper end with a roller mounting 17 and a relatively small roller 18 thereon. At the bottom of the tubular frame 16 is a similar mounting 19 and roller 20 thereon. A supply roll of filtering medium or web 21 is mounted adjacent the roller 18 in a suitable upper housing 22 at the top of frame housing 7 which has upright side members 8 and a bottom housing 9 to receive used rolls. It will be understood that the upper housing 22 encloses the roll 21 and prevents leakage of air past the filter means. The filter web 23 is fed from the roll 21 around the roller 18, down the side of the tubular framework 16 which acts to support it and around the bottom roller 20 to a take-up roll 24 mounted at the bottom of the framework structure 16.

Tubular framework 16 has fastened thereto mounting means 25 and 26 which are fastened by parallel links 27 and 28 to rods 29 and 30, on which the entire framework 16 and the web 23 carried thereby are movably mounted for movement of translation along a circular path. Rods 29 and 30 are carried by the side members 8 of frame housing 7 which supports the entire framework 16 and web 23 sub-assembly, permitting sealing movement in relation to flanges 33 which extend toward each other along the inner edges of upright side members 8. The framework 16 and web 23 are moved bodily along a circular path and maintained parallel to the flanges 33. It will be seen that the effectiveness of solenoid 34 and counterweights 31 and 32 in creating and maintaining the seal is enhanced by keeping the links 27 and 28 relatively short and arranging the geometry so that they approach the horizontal when the indentation 46 is maximum. To allow for variations in webs the links 27 and 28 should be so chosen in length and position that they are always at an angle below the horizontal. The bodily movement by the framework 16 and the web 23 into and out of sealing relation with flanges 33 produces an even and effective sealing action along the entire margins of the passage. On release the entire seal is broken at once and the web 23 may be advanced completely automatically with minimum delay and leakage at the edges. Counterweights 31 and 32 act through the linkages 27 and 28 to hold the frame member 16 against a flanging 33 with the filter web 23 therebetween. Once the tubular member 16 is pressed against flanging 33 and set, the weights 31 and 32 are sufficient to maintain a seal at the edges of the web 23 by the joint action of the tube 16 and the flangings 33.

Figure 3:
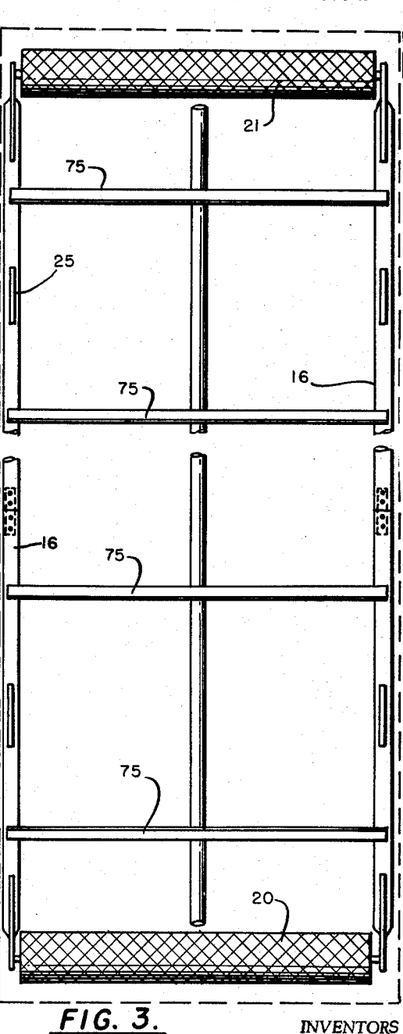
Figure 3 is a front view of one seal assembly according to the invention.

Counterweight 32 is connected to a solenoid 34 by a suitable linkage 35. As will be explained below, during the operation of the device, once the web material has been advanced and the advancing motor shut off, solenoid 34 acts instantaneously to pull down on the counterweight 32 and through linkage 28 acts to seat the frame 16 against the flange 33 and form the seal mentioned above. Once this seal is formed, the counterweights 32 and 31 have no difficulty in maintaining it. However, because of the material forming the web, spun glass or the like, better results are obtained by this positive sealing action at the initial stages as soon as the web material has been advanced. A metering device 50 actuated by a wind vane 51 is shown in Figure 2 mounted adjacent the upper clean part of filter web 23 so that air passing through web 23 deflects vane 51 and opens the circuit of a motor 39. The plan view of Figure 3 shows cross members 75 which space and support the tubular framework 16 and the web 23.

Figure 4:
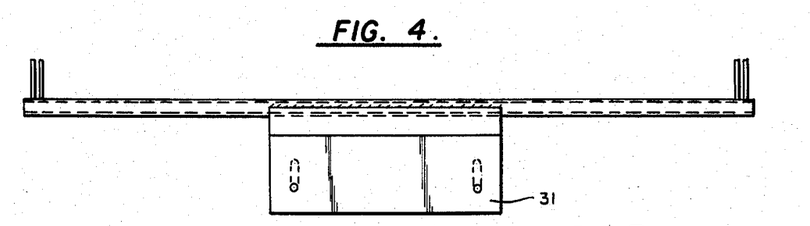
Figure 4 is a plan view of a structural detail.
Figure 8:
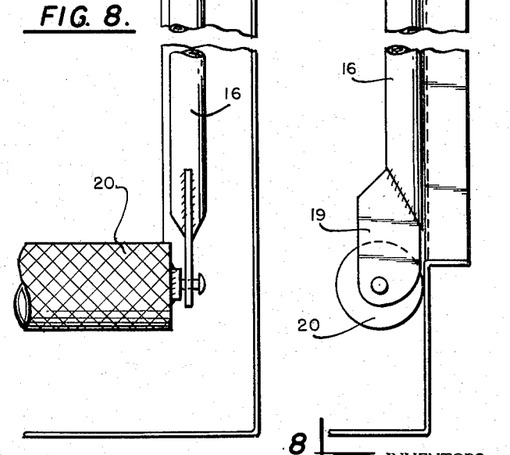
Figure 8 shows an enlarged elevation of a winding roll for advancing the filter material.
Figure 9:
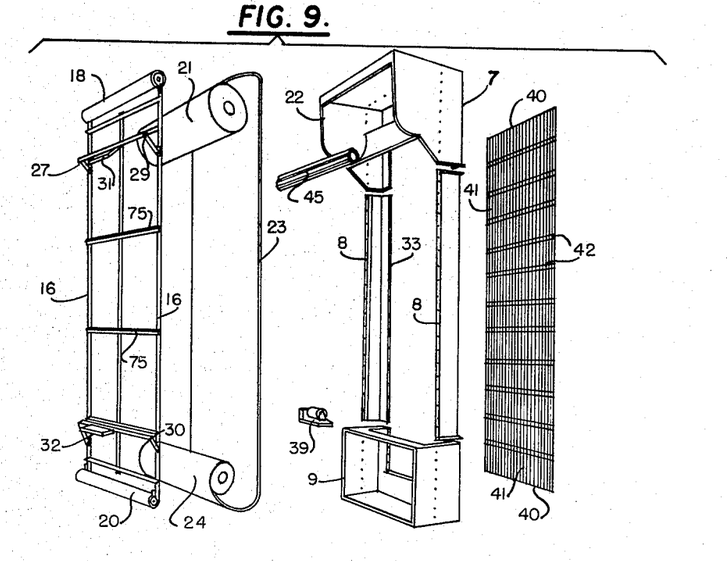
Figure 9 is an exploded perspective view of one form of the invention.
Figure 10:
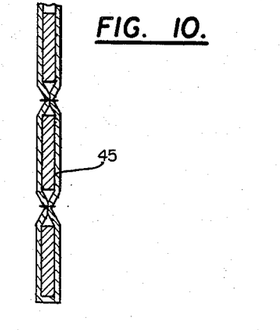
Figure 10 is a sectional view of the closure means of wrap around slats.
Figure 11:
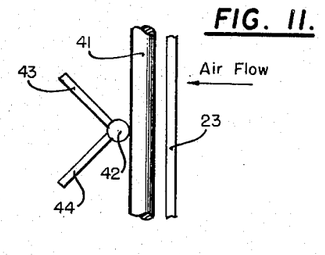
Figure 11 is a fragmentary elevation of one form of grill means for producing turbulence.

As shown in Figure 4, the counterweights 31 and 32 may be adjustable as shown by the dotted lines indicating slots in order to adjust the leverage which they are able to exert through the linkages 27 and 28 upon the frame member 16 and the web 23 to produce the sealing action. Bottom roller 20 carried by the mounting means 19 may be of expanded metal or like material as shown in Figure 8. This has the advantage of permitting some accumulated dirt to fall through the roller but primarily the expanded metal or like projections on the roller 20 serve to grip the web material 23 and afford a positive measuring means for indexing purposes in advancing the roll a definite desired amount. This method is selected to avoid slip and also to avoid any complicated correction for the increase in diameter on the roll 24 due to the winding action in the event the roll 24 were used for this purpose. The roller 20 is normally provided with a suitable pulley 36 which is connected by a second pulley 37 to a limit switch measuring device 38. The device 38 serves to control the action of drive motor 39 so that the take-up roller 24 rotates only a definite desired amount. While the limit switch measuring device 38 need not be used in all installations, in those control situations in which there is merely an on and off switch or there is any great insensitivity on the part of the control means, a definite means of determining the advance of the web 23 should be provided. If desired, the means 38 may have suitable delay means so that it is not reactivated within a given time cycle. As shown in Figure 9, the filter structure is enclosed in a suitable frame housing 7 which is provided with a grill 40 positioned downstream in the direction the air flows. The grill 40 is constructed as shown in Figures 8 and 11 and comprises vertical wires 41 and cross wires 42. The cross wires 42 carry on them as shown, narrow ribs or plates of metal 43 and 44 which in the preferred form are about an inch wide and diverge at an angle of about 90 degrees. These ribs of metal, while not large in size, do serve to provide sufficient turbulence in the air flow immediately downstream of web 23 to reduce the static lead on the downstream side to aid in the filtering action of the web 23. This is particularly true because the grill 40 is positioned fairly close to the web 23 and well within the turbulent stream caused by the angular position of ribs 43 and 44. The upper housing 22 is provided with a wrap-around closure 45 which may be slats contained in cloth as shown in Figure 10 and and wrapped around the opening of the upper housing 22. In this way the upper housing 22 is completely closed and air is prevented from flowing around the filtering web 23.

Referring to Figure 12, it will be seen that motor 39 is connected through a metering device 50 and measuring device 38 to a power supply source 52 such as a buss line or the like. A switch 53 may be provided to connect the motor directly across the line and of course such manual switch control of the motor directly may be desirable in some applications. Solenoid 34 is connected to power line 52 through the measuring device 38. It will be understood that this showing is schematic entirely and that all of the devices comprising the solenoid 34, the motor 39, metering device 50 and measuring device 38, may be connected to a central control means. The metering device may comprise an air flow meter or anemometer which may have the usual vaned wheel or a deflecting vane such as 51, a pressure differential meter having sensitive members on each side of the web 23 in order to determine pressure differential thereacross, a straight timing device or a remote control switch which initiates the action of motor 39 by supplying power thereto and causing it to wind the filter web 23 onto drum 24. The measuring or indexing device 38 is controlled by the motion of the roller 20 and operates to open the circuit after a predetermined amount of the web 23 has passed over the roller 20. The solenoid 34 is operated for a short period after the motor 39 is stopped so as to perform its sealing function. Thereafter the solenoid 34 is de-energized by breaking the circuit and the effect of counterweights 31 and 32 is sufficient to maintain the seal.

Although the diagram of Figure 12 shows one side grounded for simplicity it will be understood that double lines of supply for power and control may be used. One side of supply line 52 is shown grounded at 100. Metering device 50, discussed above, has an operating vane such as shown at 51, a bellows arrangement, differential switch or the like. Vane 51 can operate to close terminals 101 and 102 directly or it can operate relay 103 when the air flow drops to a value indicating the need of new filter material. When relay 103 operates, it pulls down bar 104 against the action of spring 105 and closes the circuit through wire 106 to the index or measuring device in which contacts 107 and 108 are normally closed by bar 109. Wire 119 leads from contact 107 to motor 39 which is grounded at 111. It will be seen that the action of bar 104 completes the motor circuit and motor 39 begins to wind up the web 23 onto take-up roller 24. This action causes bottom roller 20 to turn without slippage and to actuate indexing or measuring means 38. Motor 39 and measuring means 38 continue to operate until a measured amount of new clean web 23 is presented to the air stream at which time the relay 112 operates to pull down bar 109 against the action of spring 113 and break the motor circuit at contacts 107 and 108, of wires 106 and 119. Relay 103 is provided with sufficient delay on opening as by means of a dash pot air cylinder or the like, to keep the motor circuit closed until relay 112 operates. When relay 112 breaks the motor circuit at 107, 108 it closes contacts 114 and 115 in the circuit of solenoid 34. Contact 115 is grounded at 116 and contact 114 is connected by a wire 117 to solenoid 34 which is connected to the other side of supply line 52 by wire 118. The closing of contacts 114 and 115 energizes solenoid 34 which pulls down counterweight 32, forcing frame 16 into the web 23 which is thus compressed against flanging 33 with a sealing indentation therein. The return of bar 109 is also delayed and the bar 109 does not close contacts 107, 108 until after contacts 101, 102 have opened by the action of spring 105 on bar 104. On the return of bar 109 to its normally closed position across terminals 107, 108 the terminals 114 and 115 are open and solenoid 34 is de-energized. The device is now ready for the next cycle.

It will be noted that manual switch 53 may be used to advance web 23 at will. A similar switch connecting wire 106 to the line may be employed where it is desired to tie the filter control into the overall fan control for an installation such as shown in Figure 1. In this arrangement device 50 would be eliminated and switch 120 would comprise the regular fan switch which is closed once each working day.

The variation shown in Figure 12A eliminates the measuring device 38. Metering device 50 has a relay 127 with two sets of normally open contacts, one set being 122, 123 in the supply circuit of motor 39 and the other set of contacts being 124, 125 in the supply circuit to solenoid 34. When the bar 126 is pulled down by actuation of the coil of relay 127, the circuit of motor 39 is closed at contacts 122, 123 and web 23 is advanced until metering device 50 indicates the air flow is sufficient. At this time a return spring acts to carry bar 126 beyond its normal open position into contact with and closing contacts 124, 125, completing the circuit of solenoid 34 which is actuated. Contacts 124 and 125 are resiliently mounted as shown so that the circuit across them will be closed a sufficient time to allow solenoid 34 to operate. By the time solenoid 34 has operated to seal the web 23 between frame 16 and flanging 33, bar 126 has returned to normal open position between the two sets of contacts 122, 123 and 124, 125, both of which are open and ready for the next cycle.

Where the metering device is an air flow meter 50 having a vane 51 in the path of the air current such as shown in Figure 2, there is some tendency to insensitivity and under these circumstances an indexing or measuring device such as shown at 38 is found to be highly desirable. Where, however, the measuring device takes the form of a differential pressure manometer or similar instrument having pressure sensitive terminals on each side of the web 23, it has been found that the use of the measuring or indexing means 38 is not so necessary because the fall in differential pressure which indicates a blocking of the pores in the filtering web 23, is fairly sensitive as far as these measurements are concerned and there is little tendency to cause the motor 39 either to fail to operate at the proper time, run longer than a desired period or to hunt. Of course where the motor control means takes the form of a direct timing switch and a definite amount of material is moved forward at a preselected time during each day, the indexing device 38 is necessary as a means of adjusting for the changing radius of the web material on the roll 42. The same is true where the automatic filtering device and motor 39 are operated by means of a remote control switch which is linked to the fan control of the entire assembly so that when the fans are turned on at the beginning of the day the indexing or advancing of the web 23 takes place as part of the same operation and is repeated from day to day whenever the fans are operated. This of course has utility only where the fans are turned on at selected periods as a matter of definite routine which is not varied. Manual control for operating the motor is desirable under these circumstances so that the web may be advanced in case of unusual heavy dust conditions or the like. Of course the same result may be obtained by merely breaking the fan circuit and reclosing it, which would then cause the motor 39 to run to advance a predetermined amount of the web 23.

Figure 5:
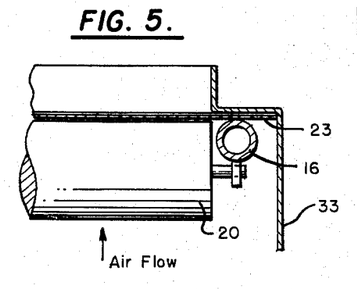
Figure 5 is an elevation of another structural detail.
Figure 5A:
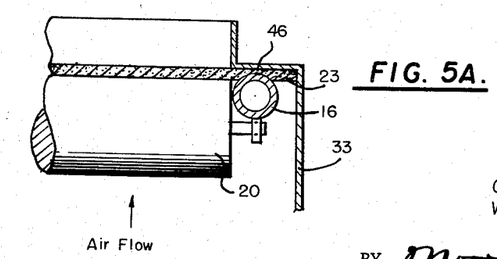
Fig. 5A shows the detail of Fig 5 with the side seal formed.
Figure 6:
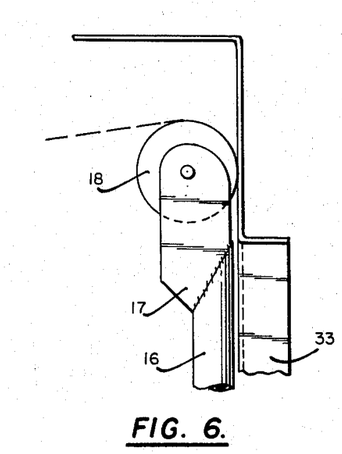
Figure 6 is a fragmentary elevation of a structural detail.
Figure 7:
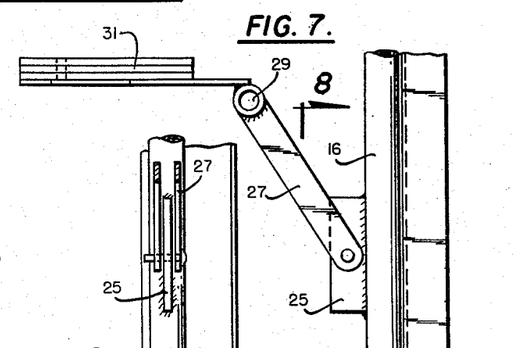
Figure 7 shows an enlarged side elevation of a portion of the sealing means according to the invention.

The operation of the device is as follows. A roll of webbed spun glass filtering material or the like such as 21 is inserted in the upper housing 22 and pulled over the roller 18, down the tubular frame 16 and between it and the flanging 33, around the bottom roller 20 and onto the take-up reel or roller 24. While the material comprising web 23 is initially fairly well compressed, as it is spun glass it springs out due to its inherent resilience, when between the flange 33 and the tubular frame member 16 it has a substantial thickness which may vary from three-quarters to one and a half inches depending upon the character of material supplied. When the filter web 23 is in place, the solenoid 34 may be actuated in order to pull down on counterweight 32, force link 28 to rotate counterclockwise and push the frame 16 strongly against flanges 33 and cause the tubular frame 16 to indent itself into the material of the web 23 where it forms semicircular impressions as at 46 in Fig. 5A which are maintained thereafter by the action of the counterweights 31 and 32. As the fans 11 and 12 operate, they draw air through the filter web 23 as indicated by the arrows. This air may be treated as shown at 13 and 15 by heating means. It may be moistened by suitable means, dried or cooled as may be desired. As noted above, the filter comprising one panel of the measurements mentioned will accommodate 28,000 feet of air per minute at a velocity of 500 feet per minute. As this air approaches the frame member 16 and its supported web 23 sealed in place, it passes through a grill of cross wires indicated at 40 in Figures 9 and 11. The short baffle plates 43 and 44 which are angularly mounted on the cross wires 42 cause a sufficient amount of turbulence in the air stream to improve substantially the filtering action of the web 23 as the air passes therethrough. As the air stream passes through the filter web 23, it will impinge upon a vane 51 or the like of an air speed indicator 50. The vane 51 is moved to the right and the switch 49 held in open or inoperative position. Where pressure differential means is used instead of the air speed indicator, sensitive terminals of the pressure differential are mounted one on each side of the web 23 and when the air is passing through the web 23 in a normal manner, the pressure differential between the sides thereof is too small to actuate the device. However, as filtered material removed from the air is held increasingly by the web 23 and its pores become filled to a greater and greater degree, the air experiences greater difficulty in passing therethrough and a pressure differential begins to build up which increases on the upstream side and decreases on the downstream side. In the same manner as the speed of the air stream begins to drop, its effect on the vane 51 is less and the vane tends to fall into a vertical position. At a selected point, either in the vane position or in the pressure differential, etc., the relay switch 49 shown schematically in Figure 12 as part of the metering device 50 is closed and the motor 39 shown connected to the take-up roll 24 is operated. As roll 24 begins to turn, the web 23 is wound thereon. In doing this, it will be noted that the web pulls the bottom roller 20 toward the roller 24. This action is initially resisted by the effect of the counterweights 31 and 32 acting through the linkages 27 and 28 and pressing the tubular frame 16 against the web 23 and the flange members 33 in sealing relation. This initial resistance is sufficient to cause the pull of take-up roll 24 on the web 23 to pull the frame 16 and its supported web 23 downward and back by rotating about the pivots 29 and 30. This downward action and movement to the left of the tubular member 16 breaks the seal between the three members 16, 23 and 33 and frees the web 23 so that it can be readily rolled on the take-up roll 24. Due to the expanded metal construction or the like of the bottom roller 20, there is negligible slip between it and the web, and the indexing means 38 where it is employed will cause the motor to continue to operate until a definite preselected amount of webbing 23 has been rolled up on roller 24. As stated above, the indexing member 38 will not recycle within a preselected period.

During this action it is to be noted that the frame assembly 16 and the web 23 carried thereby has been in a lowered position and shifted to the left enough to clear the flanges 33 due to the action of the linkages 27 and 28 and the pull of drum 24 on the lower portion of the web 23. As soon as the indexing device 38 operates to cut off the motor 39, the solenoid 34 is energized to pull down the weight 32 and pivot the link 38 counterclockwise, forcing the tubular frame member 16 against the rectangular flanging 33. This action compresses the web 23 therebetween and forms a sealing indentation 46 therein. The action of the counterweights 31 and 32 is sufficient to hold the frame member 16 with its supported web firmly in sealed position against the flanging 33 without further action by the solenoid 34, which is immediately cut off. The device is now ready for recycling as soon as the selected period of time has elapsed or as soon as the metering device employed, whether it be an air flow meter or pressure differential meter or the like, in the case that there is sufficient blockage of air flow through the web 23 to require the advancement of new filter material forming part of the web 23. It is to be noted that the upper housing 22 encloses the roll 21 and the web feed completely so that there is no leakage at this point around the web 23. The recycling mentioned recurs either at regular selected intervals which are periodic or as determined by the metering device employed, until the end of the web 23 carried by roll 22 is reached. The last part of this web as it is wound on the roll comprises a heavy piece of brown paper or cloth which is substantially impervious to the passage of air. As the web 23 is advanced more and more, the paper or cloth piece mentioned on the end is positioned in front of the metering device 50 so that air flow is stopped completely at this point and an indication is given that the rolls need to be changed. For this purpose a red light may be made to appear after the lapse of a selected period of time which is in excess of that normally required to advance the web so that the metering device will register again.

It will be understood that the machine can be varied in size to fit any desired application. The rolls of filter medium are held on the revolving shafts by means of dished retaining plates which center the filter web on the driven and idler shafts. Plates on the driver roller 24 may incorporate protruding angles or knife edges which mate with slits in the cardboard core for winding up the web thus giving positive transmission for advancing the filter web.

The solenoid 34 may be an air cylinder if desired. Again the counterweights may be made sufficiently heavy to initiate and maintain the seal without additional devices. However the solenoid for this purpose is preferred.

It will be understood that the direction of air flow through the unit may be reversed. This would be accomplished by moving the retaining grill to the opposite side of the web 23 where it would be mounted on the housing away from and independent of the seal, so that it would absorb the full load of air pressure. In this case the dirty roll at the bottom of the unit would be covered in bottom housing 9, so as not to contaminate the clean air stream.

The following summary of structural novelty and advantages is appended for ready reference.

(1) Maximum face area is obtained by moving the rolls of clean and dirty filter media out beyond the filter face.

(2) Large rolls of clean filter media can be accommodated in the top housing which is designed to hold rolls of long filter web lengths or thicker media to give higher efficiencies.

(3) Protective covering for the clean medium roll allows quick and easy accessibility for inspection and service.

(4) Protective retaining grill amply reinforced with angle supports makes an ideal surface for support of the medium. The medium slides along the vertical rods which are lubricated by the viscous coating on the medium. Indexing takes place with a full volume of air passing through the medium.

(5) Positive acting self-adjusting floating tubular seal provides such outstanding features as:

(a) Absolute sealing around the periphery of the medium is insured by the adjustable counterweights attached to the tubular frame work.

(b) Free movement of the medium while indexing is positively accomplished by movement of the seal outward caused by tension of the medium being wound on the dirty medium spool.

(c) Clearance for loading the clean medium into the unit is obtained by propping the seal in the wide open position.

(d) Ease of movement for the medium both while indexing and loading is greatly aided by the top and bottom idler rolls which are an integral part of the self-adjusting floating tubular seal and thus move in and out with the seal as required.

(e) Self cleaning bottom idler roll is made of rolled expanded metal to insure no dirt build-up on the roll which will be constantly in contact with the dirty side of the media.

(f) Counterweight seal adds sufficient resistance to the medium to prevent the medium from falling through the seal when heavily loaded with dirt.

(g) Constant tension on the medium eliminates any possibility of necking, stretching or sagging of the material.

(6) Standard bottom and top sections make it extremely simple to vary the height of the unit by merely changing the lengths of the side panels, vertical grill and floating seal.

(7) Small number of moving parts makes the maintenance problems almost non-existent. The only moving part is the medium itself which is driven by a simple chain and sprocket arrangement through a gear reducer and motor.

(8) Compact, tight dirty medium roll is obtained because of the constant tension on the medium from the self-adjusting floating tubular seal.

(9) Flexibility of installations is made possible by the construction of the unit which allows (a) sections to be bolted together in tandem; (b) direct attachment of fan station housing to sides and top; (c) attachment of plenum chamber on the downstream side at the face area outlet.

(10) Planned handling of the medium rolls reduces the effort and labor required to an absolute minimum. Rolls will be delivered with a kraft paper covering which is attached to the leading edge of the media thus making it possible to use the paper as a lead in when loading the medium. Kraft paper will also be attached to the end controls and warnings as well as wrap around covering for dirty medium. Attached to the end of the paper will be two pieces of twine for tying up the dirty roll for easy disposal.

While there have been described above what are at present believed to be the preferred forms of the invention, other forms will suggest themselves to those skilled in the art. All such variations as fall within the true spirit of the invention are intended to be covered by the generic terms of the claims set forth below.

We claim:

1. In combination, an automatic filter device comprising a housing having a top section for receiving a filter roll, a bottom section and spaced elongate connecting elements having sealing surfaces along adjacent portions for engaging opposite edges of a web of filter material, a frame mounted on said housing and bodily movable with respect to said sealing surfaces, means to urge said frame bodily toward said sealing surfaces for clamping the edges of a filter web therebetween, means to advance filtering web from said top section along said sealing surfaces toward said bottom section intermittently, means to move said frame bodily with respect to said sealing surfaces and intermittently into and out of clamping relation with respect to said opposite edges of said web of filter material and said sealing surfaces to permit intermittent advance of said web of filter material when said frame and said sealing surfaces are not in clamping relation and means to control said intermittent relative movement of said frame with respect to said sealing surfaces and the intermittent advance of said web of filter material.

2. The combination set forth in claim 1, said web comprising compressible filter material carried by said frame and positioned against said sealing surfaces along opposite edges of said web, said frame being so shaped in portions thereof adjacent said sealing surfaces that in pressing the web against said surfaces the frame embeds said shaped portions in the margins of said web and holds said margins in sealing relation with said surfaces.

3. The combination set forth in claim 2, intermittent means to force said shaped portions of said frame into said web to complete an initial seal along said surfaces after each advance, said means to urge said frame bodily acting substantially continuously during the filtering action of said web.

4. The combination set forth in claim 3, a supporting grid on the downstream side of said web constructed to hold said web in position for movement of said web along said surfaces during advancement.

5. The combination set forth in claim 4, a parallel linkage connecting said frame and said housing so that the pull on said web for advancing moves said frame and said web bodily away from said surfaces and permits said web to be advanced.

6. The combination set forth in claim 1, a supporting open grid on the downstream side of said web constructed and arranged to support said web against the force of air passing therethrough.

7. The combination set forth in claim 6, a linkage connecting said frame and said housing so that the pull on said web for advancing moves said frame and said web bodily away from said surfaces, and permits said web to be advanced while supported by said grid, said surfaces and said frame due to the force of the air being filtered and any leakage between said web and said sealing surfaces is minimized during the advance of said web.

8. In combination, an automatic air filter device comprising a web of filter material, movable frame supporting means for said web, housing means having elongate spaced substantially parallel sealing surfaces, said frame being mounted on said housing and bodily movable to and from said surfaces with said web therebetween, means urging said frame and said surfaces toward each other and into clamping sealing relation with said web, said mounting comprising movable means connected to said frame and providing for relative movement of said frame and said surfaces, said movable means so constructed and arranged that a pull upon said web to advance the web along said surfaces produces an initial bodily movement, at least in part movement of translation, of said frame and said web away from said surfaces to minimize the friction and any leakage space which may exist between the margins of said web and said surfaces.

9. The combination set forth in claim 8, a supporting grid on the downstream side of said web constructed to hold said web in position for movement of said web along said surfaces during advancement.

10. An automatic filter device comprising a frame housing having a passage through which air to be filtered flows, a roll of filter material mounted in said housing adjacent said passage, a movable open framework movably carried by said frame housing across said passage and supporting the active portion of said filter material in web form in air-flow intercepting filtering position across said passage, said frame housing having opposite marginal flanges extending along opposite margins of said passage and substantially perpendicular to the axis of said roll of filter material to receive the marginal edges of said active portion of said filter material in web form, said open framework having edge members constructed and positioned to clamp the marginal edges of said active portion of said filter web between said flanges and said edge members and to cause all of the air flow to be filtered to pass through said active portion of said filter material in web form, means to move said framework and said active portion of said material bodily relative to said frame housing and to clamp said marginal edges of said filter material firmly against said marginal flanges, means to advance said filter material across said passage intermittently, and means to control said means to move said framework and said means to advance said active portion to coordinate the breaking of said seal and the advance of said filter material across said passage.

11. The combination set forth in claim 10, said means to move said framework and said active portion bodily comprising two pairs of parallel links each having one end pivoted to said frame housing and the other end pivoted to said framework whereby said framework and said active portion are moved in translation relative to said marginal flanges to minimize the movement necessary to break said seal and the size of any opening through which unfiltered air might momentarily pass.

12. The combination set forth in claim 11, a supporting open grid on the downstream side of said active portion of said filter material constructed and arranged to support said active portion against the force exerted by air passing through said active portion.

13. The combination set forth in claim 12, said means to control comprising means responsive to air flow positioned and connected to initiate the bodily movement of said framework to break the seal, the advance of said active portion across said passage and the clamping action of said framework to reestablish said seal.

References Cited in the file of this patent

UNITED STATES PATENTS

| | | |
|---|---|---|
| 1,387,731 | McVicker | Aug. 16, 1921 |
| 1,783,181 | Birkholz | Dec. 2, 1930 |
| 2,119,978 | Wolthuis et al. | June 7, 1938 |
| 2,626,012 | Persons | Jan. 20, 1953 |
| 2,722,998 | Hall | Nov. 8, 1955 |
| 2,763,139 | Callan et al. | Sept. 18, 1956 |
| 2,807,330 | Rivers | Sept. 24, 1957 |
| 2,850,113 | Turner | Sept. 2, 1958 |
| 2,853,155 | Peter | Sept. 23, 1958 |

FOREIGN PATENTS

| | | |
|---|---|---|
| 985,432 | France | Mar. 14, 1951 |
| 700,352 | Great Britain | Dec. 2, 1953 |
| 746,162 | Great Britain | Mar. 7, 1956 |